(12) United States Patent
Sankaran et al.

(10) Patent No.: US 7,917,808 B2
(45) Date of Patent: *Mar. 29, 2011

(54) METHODS, SYSTEMS, AND PRODUCTS FOR VERIFYING INTEGRITY OF WEB-SERVER SERVED CONTENT

(75) Inventors: Karthiksundar Sankaran, Alpharetta, GA (US); Zakir Patrawala, Atlanta, GA (US); Timothy A. Hill, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 267 days.

This patent is subject to a terminal disclaimer.

(21) Appl. No.: 12/247,245

(22) Filed: Oct. 8, 2008

(65) Prior Publication Data

US 2009/0063908 A1 Mar. 5, 2009

Related U.S. Application Data

(63) Continuation of application No. 11/796,346, filed on Apr. 27, 2007, now Pat. No. 7,526,678, which is a continuation of application No. 10/813,492, filed on Mar. 30, 2004, now Pat. No. 7,216,256.

(51) Int. Cl.
*G06F 11/00* (2006.01)

(52) U.S. Cl. .............................. 714/27; 714/38; 717/127
(58) Field of Classification Search .................... None
See application file for complete search history.

(56) References Cited

U.S. PATENT DOCUMENTS

| | | | |
|---|---|---|---|
| 5,974,445 A | 10/1999 | Pivnichny et al. |
| 6,253,324 B1 | 6/2001 | Field et al. |
| 6,484,203 B1 | 11/2002 | Porras et al. |
| 6,523,027 B1 | 2/2003 | Underwood |
| 6,546,507 B1 | 4/2003 | Coyle et al. |
| 6,601,066 B1 | 7/2003 | Davis-Hall |
| 6,631,408 B1 | 10/2003 | Welter et al. |
| 6,671,844 B1 | 12/2003 | Krech et al. |
| 6,711,615 B2 | 3/2004 | Porras et al. |
| 6,772,208 B1 | 8/2004 | Dutta |
| 6,834,364 B2 | 12/2004 | Krech et al. |
| 6,895,551 B1 | 5/2005 | Huang et al. |
| 7,120,572 B1 | 10/2006 | Liang |
| 2002/0097268 A1 | 7/2002 | Dunn et al. |
| 2002/0156799 A1 | 10/2002 | Markel et al. |

*Primary Examiner* — Marc Duncan
(74) *Attorney, Agent, or Firm* — Scott P. Zimmerman PLLC

(57) ABSTRACT

Methods, systems, and products are disclosed for verifying the integrity of web server content. Communication with a server is initiated and content is retrieved that is specified by a Uniform Resource Locator. The content is parsed and searched for an error message. When the content contains linked content, then the linked content is parsed and also searched for the error message. The error message is logged to indicate an existence of a partial page error.

20 Claims, 6 Drawing Sheets

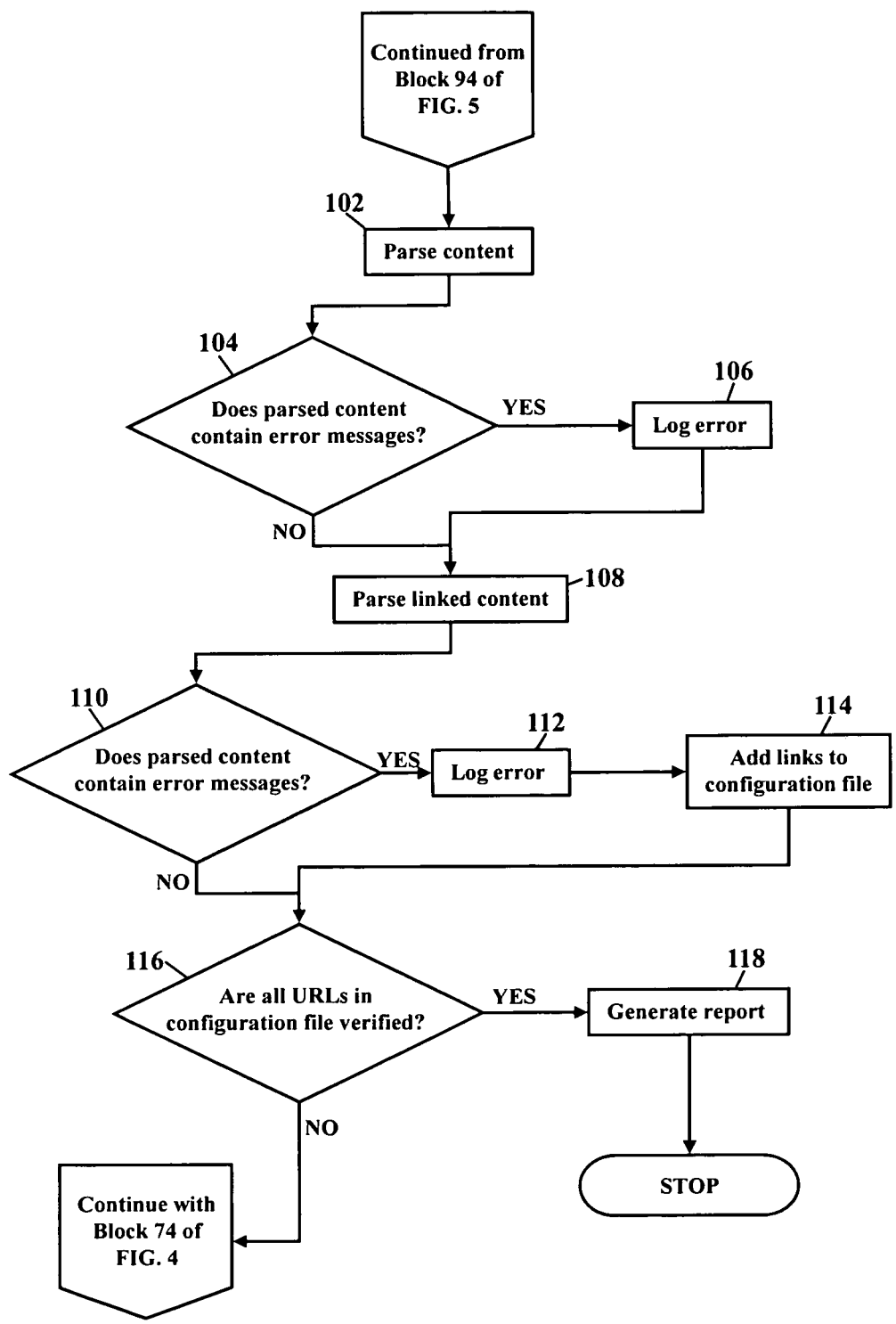

US 7,917,808 B2

METHODS, SYSTEMS, AND PRODUCTS FOR VERIFYING INTEGRITY OF WEB-SERVER SERVED CONTENT

CROSS-REFERENCE TO RELATED APPLICATIONS

This application is a continuation of U.S. application Ser. No. 11/796,346, filed Apr. 27, 2007, now issued as U.S. Pat. No. 7,526,678, which is a continuation of U.S. application Ser. No. 10/813,492, filed Mar. 30, 2004, now issued as U.S. Pat. No. 7,216,256, with each incorporated herein by reference in its entirety.

This application relates to U.S. application Ser. No. 10/813,475, now issued as U.S. Pat. No. 7,426,556, and incorporated herein by reference in its entirety.

This application also relates to U.S. application Ser. No. 10/813,474, now issued as U.S. Pat. No. 7,363,364, and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to electrical computers and, more particularly, to data processing system error/fault handling and to multicomputer data transferring.

2. Description of the Related Art

Broken web links are a common problem in the Internet industry. Internet web pages are electronic documents that are retrieved from a web server. A Uniform Resource Locator (URL) identifies the server(s) that stores/hosts the web page. These web pages, however, may themselves contain embedded links to additional content. When a web page is retrieved from the web server, all the component parts linked to that web page should also be retrievable. Often times, however, one or more links to additional content are broken. That is, when the web page is retrieved, one or more of the embedded links refer to non-existent web pages or web pages with errors. Sometimes the embedded URL address is incorrectly typed. Sometimes the server(s) storing the embedded content is malfunctioning or not available. Sometimes the servers serve partial pages due to components of the server code malfunctioning. Most times, however, the document located by the embedded URL is not longer stored on the web server. A failed embedded link often results in the familiar Error 404 "Page Not Found." When an embedded links fails, components are missing and the integrity of the web page is lost. The user requesting the web page is frustrated, and the web master responsible for the web page is frustrated. There is, accordingly, a need in the art for methods, systems, and products for verifying the integrity of content served by web server(s).

BRIEF SUMMARY OF THE INVENTION

The aforementioned problems, and other problems, are reduced by this invention. This invention comprises methods, computer systems, computer programs, and computer program products that verify the integrity of web content. This invention systematically and thoroughly crawls the web content from a client perspective. If the web content contains broken links, or error messages that might indicate broken links, this invention reports those conditions. This invention works by parsing web page content and searching for error messages. This invention also parses any additional, linked content and similarly searches for error messages. If any error messages are found, these error messages are logged and reported. This log of error messages allows an administrator or web master to pinpoint erroneous links and/or missing web content.

This invention is also easy to use. The user need only input the Uniform Resource Locator (URL) of a starting web page. That is, the user need only load the URLs of web pages that need to be checked for integrity. The user, for example, inputs www.home.BellSouth.net, and this invention automatically retrieves that web page and any embedded links inside that web document. The user, then, need only load the starting page; there is no need for the user to specify every link within that starting page. This invention will then retrieve and verify any links within that starting page. All the content associated with the starting page, and with each embedded link, is checked for integrity. If any errors are found, this invention logs those errors for further analysis. This invention is also completely configurable, in that the user may specify how frequently each web page is analyzed and how many levels of the web page should be analyzed (e.g., the web page "http://www.home.bellsouth.net" may link to "stocks.bellsouth.net," which in turn may link to "money.bellsouth.net"). This invention thus allows an administrator or web master to quickly and to easily crawl a list of web pages. If any errors are found, this invention reports those errors and, thus, alerts the administrator and/or web master to any potential failure point in the web page software.

Exemplary embodiments describe methods, systems, and products for verifying the integrity of web server content. One of the embodiments describes an Integrity tool that distinguishes "partial page" errors from other errors. Communication with a server is initiated and content is retrieved that is specified by a Uniform Resource Locator. The content is parsed and searched for an error message. When the content contains linked content, then the linked content is parsed and also searched for the error message. The error message is logged to indicate an existence of a partial page error.

Another of the embodiments describes a system for verifying the integrity of web server content. The system includes means for communicating with a server specified by a Uniform Resource Locator. The system includes means for retrieving content at a client that is specified by the Uniform Resource Locator. Means for parsing the content and searching for an error message is also included. When the content contains linked content, then means for parsing the linked content and also for searching for the error message is included. Means for logging the error message is included, and the error message indicates an existence of a partial page error.

Other embodiments describe a computer-readable medium that includes processor-executable instructions. These instructions cause communication with a server specified by a Uniform Resource Locator. Content is retrieved that is specified by the Uniform Resource Locator. The content is parsed and searched for an error message. When the content contains linked content, then the linked content is parsed and also searched for the error message. The error message is logged to indicate an existence of a partial page error.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein:

FIGS. 4-6 are flowcharts illustrating a method of verifying the integrity of web server content, according to the embodiments of this invention.

DETAILED DESCRIPTION OF THE INVENTION

Figure 1:
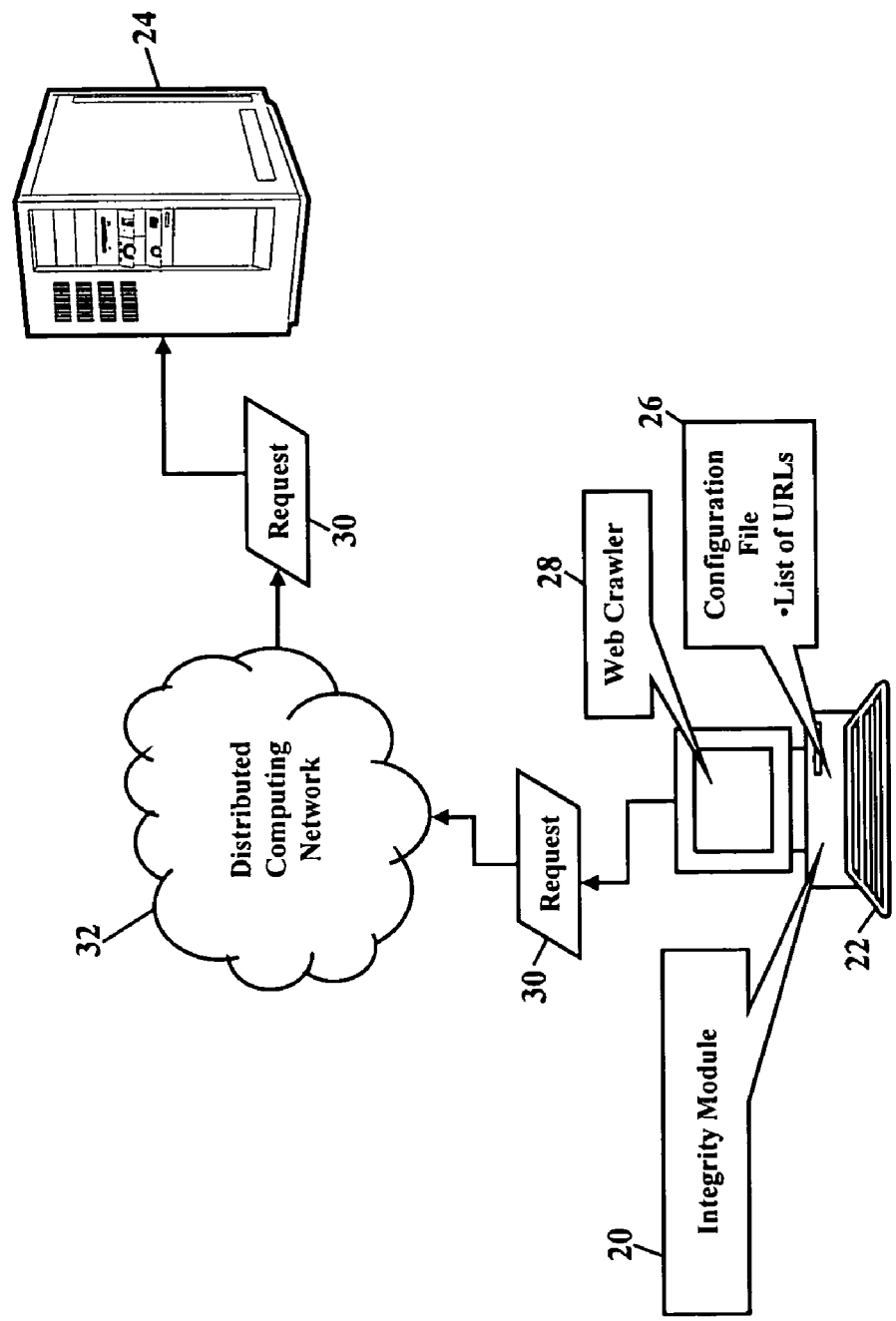
FIGS. 1 and 2 are simplified schematics illustrating the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention verifies the integrity of web content. A web server often stores/hosts web content that frequently changes. Because this web content frequently changes, the web content may contain broken links that destroy the integrity of the web content. This invention, however, systematically and thoroughly crawls the web content from a client perspective. If the web content contains embedded links to additional content, this invention parses the content and searches for error messages. This invention also parses any additional, linked content and similarly searches for error messages. If any error messages are found, these error messages are logged and reported. This log of error messages allows a user (such as an administrator or web master) to pinpoint erroneous links and/or missing web content.

This invention is also easy to use. The user need only input the Uniform Resource Locator (URL) of a starting web page. That is, the user need only load the URLs of web pages that need to be checked for integrity. The user, for example, inputs http://www.home.BellSouth.net, and this invention automatically retrieves that web page and any links inside that web document. The user, then, need only load the starting page; there is no need for the user to specify every link within that starting page. This invention will then retrieve and verify any links within that starting page. All the content associated with the starting page, and with each embedded link, is checked for integrity. If any errors are found, this invention logs those errors for further analysis. This invention is also completely configurable, in that the user may specify how frequently each web page is analyzed.

Figure 2:
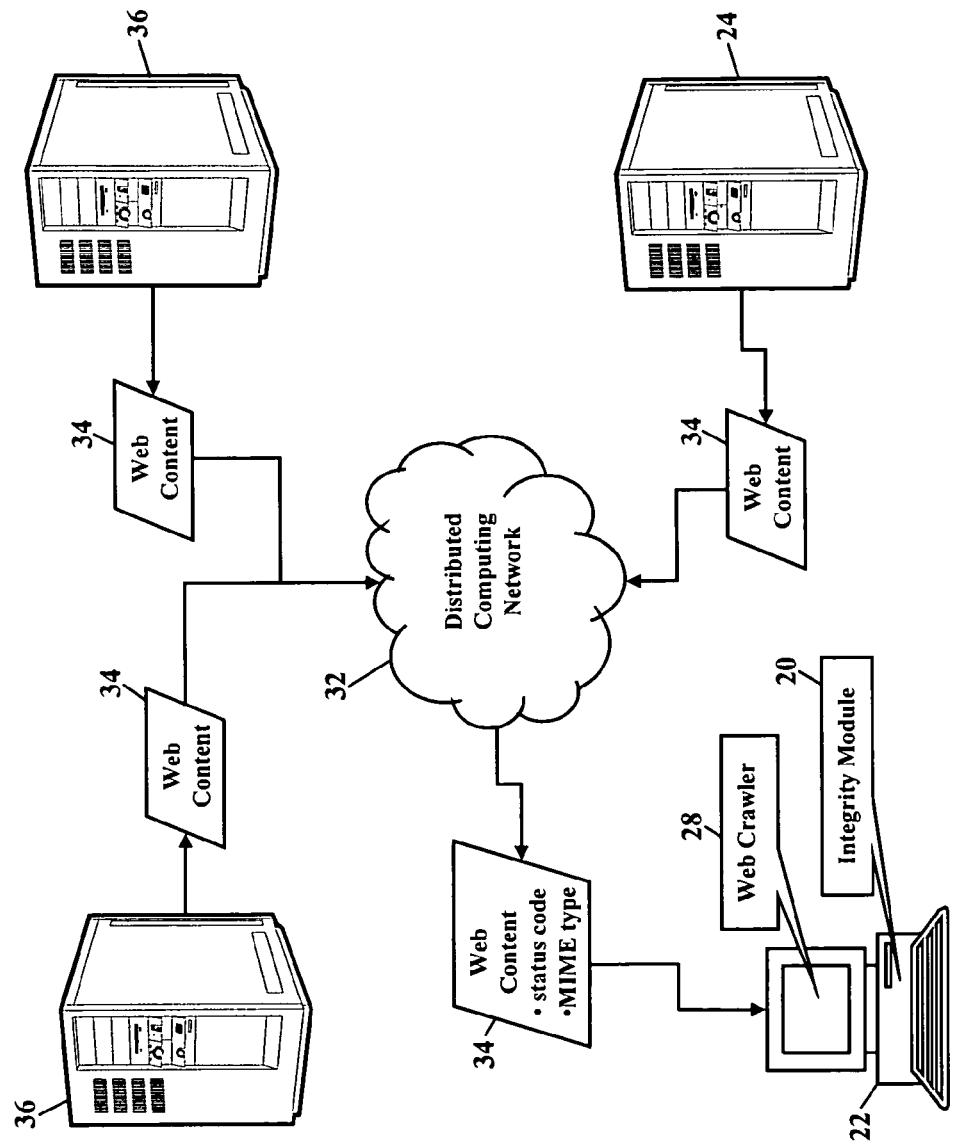

FIGS. 1 and 2 are simplified schematics illustrating this invention. The embodiments of this invention include a client-resident Integrity Module 20. The Integrity Module 20 comprises methods, systems, computer programs, and/or computer program products that verify static and dynamically-generated web server content. The Integrity Module 20 operates within any computer system, such as a client computer 22. When the client computer 22 receives web content from a web server 24, the Integrity Module 20 helps verify the integrity of the content. As those of ordinary skill in the art of computing recognize, the content from the web server 24 may have both static portions and dynamic portions. That is, the content may contain static portions (such as text and pictures) and dynamic portions (personalized content and Uniform Resource Locator links to other content). If any portion of this static and dynamic content is missing, then the integrity of the content is lost. That is, the content is not complete-something is missing. The Integrity Module 20, then, helps determine whether the content is complete. If some portion is missing, the Integrity Module 20 also provides a report that helps an administrator/user to track and to locate the missing portions.

FIG. 1 illustrates how web server content is verified. The Integrity Module 20 first reads a configuration file 26. This configuration file 26 resembles a list of Uniform Resource Locators (URLs) that need to be verified. When a user (such as an administrator and/or web master) wants to verify the integrity of web content, the user loads the configuration file 26 with the URLs of web pages that need to be checked for integrity. The user inputs the Uniform Resource Locator of a home page (e.g., http://www.home.BellSouth.net), and the Integrity Module 20 retrieves that web page and any links inside that document. The user need only load the configuration file 26 with the starting page; the user need not specify every link within that starting page. The configuration file 26, in fact, may be loaded with any number of starting web pages, and the Integrity Module 20 will sequentially retrieve and verify any links within each starting page.

The Integrity Module 20 reads a URL from the configuration file 26. The Integrity Module 20 then initiates a communication link to the web server 24 specified by that Uniform Resource Locator. The client computer 22 typically utilizes a web crawler-type application hereafter referred to as a web crawler 28 to issue a request 30 to the web server 24. The request 30 communicates from the client computer 22 to the web server 24 via a distributed computing network 32. The web crawler 28 is stored/maintained within the client computer 22. As those of ordinary skill in the art of computing understand, the web crawler 28 is a computer program that offers the user access to the distributed computing network 32, such as the Internet (sometimes alternatively known as the "World Wide Web"), an intranet, a local-area network (LAN), and/or a wide-area network (WAN). The web crawler 28 allows for the retrieval of content from web servers.

FIG. 2 illustrates the return of web content 34. When the web server 24 receives the request (shown as reference numeral 30 in FIG. 1), the web server 24 retrieves the web content 34 corresponding to the request. As FIG. 2 shows, the web server 24 may then itself delegate the retrieval of the web content 34 to one or more application servers 36. The web content 34 then communicates to the client computer 22 via the distributed computing network 32. When the web content 34 is received, the Integrity Module 20 then checks the status code and the Multipurpose Internet Mail Extension (MIME) type of the returned resource. The status code returned is used to determine if the resource is retrievable. If the status code returned indicates an error, the status code is stored/logged in memory. As the following paragraphs explain, the Integrity Module 20 uses the MIME designation to determine if the web content 34 might contain additional links to other content. The Integrity Module 20 will then parse the web content 34 to determine if any error messages are contained within the web content 34. These error messages indicate a "partial page" error may exist. The Integrity Module 20 also produces a report that helps the user to track and to resolve these partial page errors.

Figure 3:
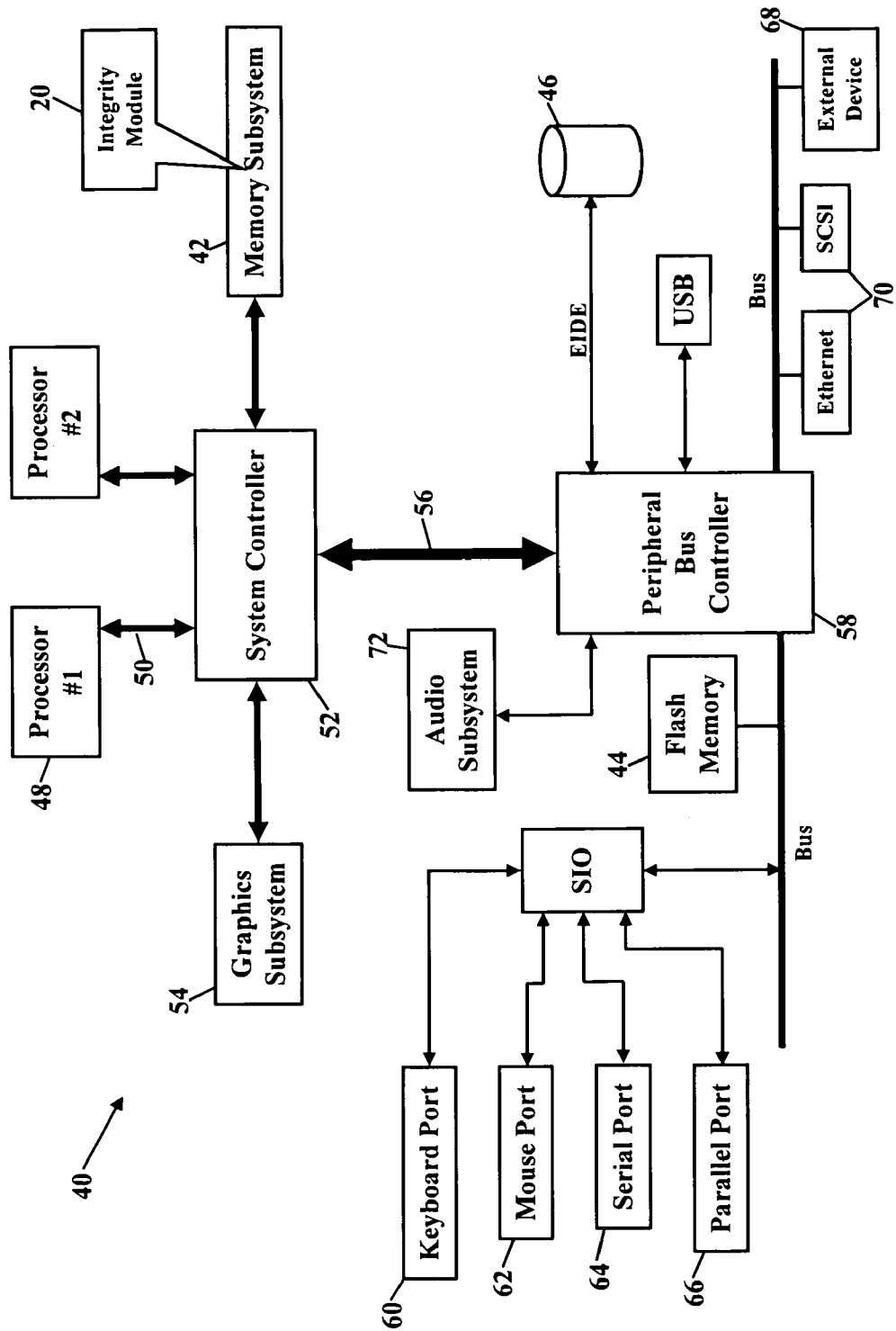
FIG. 3 depicts possible operating environments for one or more embodiments of this invention.

FIG. 3 illustrates an alternative operating environment for this invention. FIG. 3 is a block diagram showing the Integrity Module 20 residing in a computer system 40. The computer system 40 may be any computing system, such as the client computer 22 (or the web server 24, the application server 36, or any other computer device). As FIG. 3 shows, the Integrity Module 20 operates within a system memory device. The Integrity Module 20, for example, is shown residing in a memory subsystem 42. The Integrity Module 20, however, could also reside in flash memory 44 or a peripheral storage device 46. The computer system 40 also has one or more central processors 48 executing an operating system. The operating system, as is well known, has a set of instructions that control the internal functions of the computer system 40. A system bus 50 communicates signals, such as data signals, control signals, and address signals, between the central processor 48 and a system controller 52 (typically called a "Northbridge"). The system controller 52 provides a bridging function between the one or more central processors 48, a graphics subsystem 54, the memory subsystem 42, and a PCI (Peripheral Controller Interface) bus 56. The PCI bus 56 is controlled by a Peripheral Bus Controller 58. The Peripheral Bus Controller 58 (typically called a "Southbridge") is an integrated circuit that serves as an input/output hub for various peripheral ports. These peripheral ports are shown including a keyboard port 60, a mouse port 62, a serial port 64 and/or a parallel port 66 for a video display unit, one or more external device ports 68, and networking ports 70 (such as SCSI or Ethernet). The Peripheral Bus Controller 58 also includes an audio subsystem 72. Those of ordinary skill in the art understand that the program, processes, methods, and systems described in this patent are not limited to any particular computer system or computer hardware. Other architectures are possible, and the Integrity Module 20 can operate in any architecture.

Those of ordinary skill in the art also understand the central processor 48 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), Sun Microsystems, Inc. (4150 Network Circle, Santa Clara Calif. 95054, www.sun.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple-.com). Those of ordinary skill in the art again understand that the program, processes, methods, and systems described in this patent are not limited to any particular operating system.

The system memory device (shown as memory subsystem 42, flash memory 44, or peripheral storage device 46) may also contain an application program. The application program cooperates with the operating system and with a video display unit (via the serial port 64 and/or the parallel port 66) to provide a Graphical User Interface (GUI). The Graphical User Interface typically includes a combination of signals communicated along the keyboard port 60 and the mouse port 62. The Graphical User Interface provides a convenient visual and/or audible interface with a user of the computer system 40.

Figure 4:
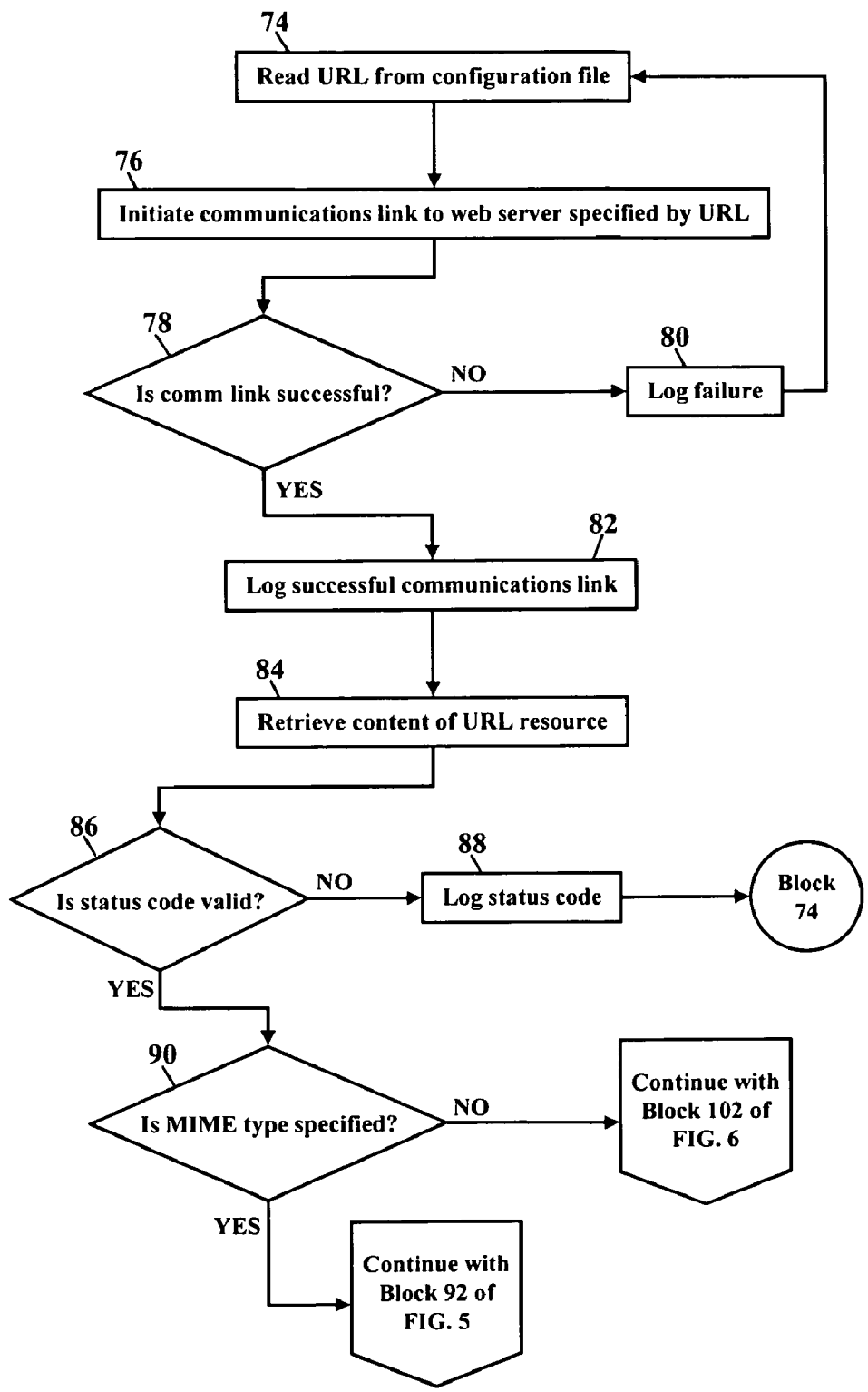

FIG. 4 is a flowchart illustrating a method of verifying the integrity of web server content. A Uniform Resource Locator (URL) is read from a configuration file (Block 74). The configuration file (shown as reference numeral 26 in FIG. 1), as earlier described, contains a list of Uniform Resource Locators requiring verification. A communications link is then initiated to a web server specified by that URL (Block 76).). If the communications attempt fails (Block 78), that failure is logged (Block 80) and the next URL in the configuration file is read (Block 74). If, however, the communications link is successful (Block 78), the successful communications attempt is logged (Block 82) and the content of the URL resource is retrieved (Block 84).

The validity of the returned status code is then checked (Block 86). The status code is used to determine if the resource is retrievable. If the returned status code indicates an error (Block 86), the status code is logged (Block 88) and the next URL in the configuration file is read (Block 74).

The MIME type is then checked (Block 90). When the content is received, the Integrity Module (shown as reference numeral 20 in FIGS. 1-3) determines what integrity tests should be conducted. The particular test chosen is based upon the type of resource received. As those of ordinary skill in the art understand, some web page resources might contain text, HTML data, and/or image data (e.g., .jpg). When the Integrity Module initiates the request (shown as reference numeral 30 in FIG. 1), the request also asks the web server (shown as reference numeral 24 in FIGS. 1 and 2) to identify the type of resource that will be returned. The Integrity Module analyzes the headers (e.g., HTTP headers) for the Multipurpose Internet Mail Extension (MIME) type of the returned resource. If no MIME resource type is returned by the web server (Block 90), then the Integrity Module parses the web content to determine if additional links are included (see Block 102 in FIG. 6). As those of ordinary skill in the art also understand, the MIME designation describes a standard system for identifying the type of data contained in a file resource. The MIME system identifies a resource based on its file extension. Those of ordinary skill in the art also recognize the term "HTML" means Hypertext Markup Language, and HTML is a language used for creating hypertext documents on the World Wide Web and for controlling how web pages appear.

Figure 5:
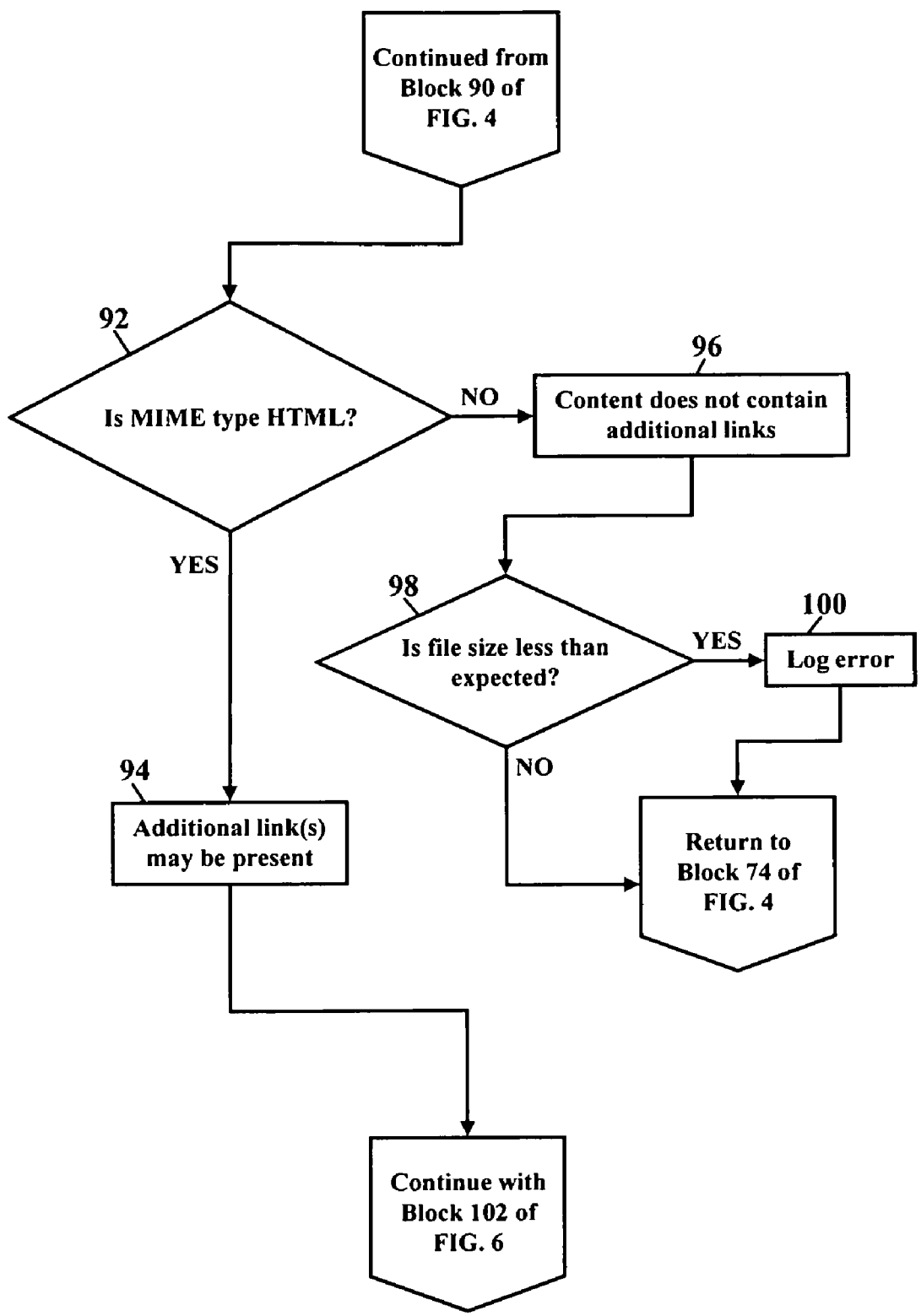

The flowchart continues with FIG. 5. The Integrity Module next determines whether the resource contains additional links. The terms "link," "links," and "additional links" all indicate the content contains an embedded Uniform Resource Locator to other content. If, for example, the MIME resource type is HTML data (Block 92), the Integrity Module knows that the returned data may contain additional links (Block 94). If, however, the MIME resource type is not HTML data (such as an image file or audio files) (Block 92), then the Integrity Module assumes the returned data does not contain additional links (Block 96).

The Integrity Module may inspect the file size of the web content. When the MIME resource type indicates no HTML data is present (Block 92), the Integrity Module assumes the returned data does not contain additional links (Block 96). The Integrity Module, however, ensures integrity by checking the file size of the web content. If the file size is less than expected (Block 98), then an error is logged (Block 100). The Integrity Module, as earlier described, analyzes the headers for the MIME type of the returned resource. These headers may also describe the expected file size (in bytes) of the returned resource. If the returned resource does not match the expected size identified in a header, then the Integrity Module knows an error has occurred. If, for example, the Integrity Module is expecting a fifty kilobyte (50 KB) file size, but the actual file size is only ten kilobytes (10 KB), then the Integrity Module logs an error. Similarly, these headers might also themselves contain an error code or other indication that content is missing, so the Integrity Module again logs an error. After the error is logged (Block 100), the Integrity Module then returns to the configuration file and reads the next URL (see Block 74 of FIG. 4).

The Integrity Module may also parse the content. When the MIME resource type is HTML data (Block 92), the Integrity Module knows that the returned data may contain additional links (Block 94). When an additional link may be present, the Integrity Module parses the content (Block 102). The Integrity Module breaks down the content and searches for error messages. If any error message is found (Block 104), the Integrity Module again logs an error (Block 106). The Integrity Module is especially useful for finding partial page errors. Should the parsed content contain an error message, this error message may indicate that one of the web server's components failed. So, even though the web server sends a successful return code, the content actually contains faulty data. This faulty data usually results in a partial page error, where some content component fails. The Integrity Module can thus be used to distinguish partial page errors.

The Integrity Module also checks the integrity of the additional links. Because the content contains additional links to other content (Block 94), the Integrity Module also parses this linked content (Block 108). If any error message is found in the linked content (Block 110), the Integrity Module again logs an error (Block 112). The Integrity Module also adds those additional links to the configuration file (Block 114). When all URLs in the configuration file have been verified (Block 116), a report is generated (Block 118). If, however, a URL remains to be verified (Block 116), the Integrity Module then returns to the configuration file and reads the next URL (see Block 74 of FIG. 4).

The Integrity Module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Integrity Module to be easily disseminated. A computer program product for verifying the integrity of web server content includes the Integrity Module stored on the computer-readable medium. The Integrity Module communicates with a server specified by a Uniform Resource Locator. The Integrity Module retrieves content specified by the Uniform Resource Locator. If the content contains an additional link to another Uniform Resource Locator, then the Integrity Module parses the content to determine if the content contains an error message. The error message may indicate existence of a partial page error.

The Integrity Module may also be physically embodied on or in any addressable (e.g., HTTP, I.E.E.E. 802.11, Wireless Application Protocol (WAP)) wireline or wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
    retrieving content specified by a Uniform Resource Locator;
    determining whether the content includes an error message;
    checking a Multipurpose Internet Mail Extension (MIME) designation to determine when the content contains an additional link to linked content;
    determining whether the linked content also includes the error message; and
    logging the error message to indicate an existence of a partial page error.

2. The method according to claim 1, further comprising determining a static portion of the content contains an error.

3. The method according to claim 1, further comprising determining a dynamic portion of the content contains an error.

4. The method according to claim 1, further comprising receiving a status code associated with the content.

5. The method according to claim 4, further comprising using the status code to determine if the content is retrievable.

6. The method according to claim 1, further comprising parsing the content for the error message.

7. The method according to claim 1, further comprising determining an integrity test to be conducted on the content.

8. The method according to claim 7, further comprising requesting a type of resource associated with the content.

9. The method according to claim 8, further comprising choosing the integrity test based on the type of resource.

10. The method according to claim 1, further comprising analyzing a packet header for the Multipurpose Internet Mail Extension designation.

11. The method according to claim 1, further comprising analyzing a file size associated with the content.

12. The method according to claim 1, further comprising logging an error when an expected file size of the content fails to match an actual file size.

13. The method according to claim 1, further comprising reading a configuration file specifying a list of Uniform Resource Locators to be verified.

14. The method according to claim 1, further comprising receiving a list of Uniform Resource Locators to be checked for integrity.

15. A system, comprising:
  a processor executing instructions stored in memory that cause the processor to:
  retrieve content specified by a Uniform Resource Locator;
  determine whether the retrieved content includes an error message;
  check a Multipurpose Internet Mail Extension (MIME) designation to determine when the retrieved content contains an additional link to linked content;
  determine whether the linked content also includes the error message; and
  log the error message to indicate an existence of a partial page error.

16. The system according to claim 15, further comprising code that causes the processor to determine an integrity test to be conducted on the content.

17. The system according to claim 16, further comprising code that causes the processor to request a type of resource associated with the content.

18. The system according to claim 17, further comprising code that causes the processor to choose the integrity test based on the type of resource.

19. A computer-readable medium storing processor-executable instructions for performing a method, the method comprising:
  retrieving content specified by a Uniform Resource Locator;
  determining whether the content includes an error message;
  checking a Multipurpose Internet Mail Extension (MIME) designation to determine when the content contains an additional link to linked content;
  determining whether the linked content also includes the error message; and
  logging the error message to indicate an existence of a partial page error.

20. The computer-readable medium according to claim 19, further comprising instructions for:
  determining an integrity test to be conducted on the content;
  requesting a type of resource associated with the content; and
  choosing the integrity test based on the type of resource.

* * * * *